US 8,429,056 B2

(12) United States Patent
Ginsberg

(10) Patent No.: US 8,429,056 B2
(45) Date of Patent: Apr. 23, 2013

(54) SYSTEMS AND METHODS FOR SHARING EXCESS PROFITS

(75) Inventor: Phillip M Ginsberg, New York, NY (US)

(73) Assignee: BGC Partners, Inc., New York, NY (US)

( * ) Notice: Subject to any disclaimer, the term of this patent is extended or adjusted under 35 U.S.C. 154(b) by 3859 days.

(21) Appl. No.: 09/955,594

(22) Filed: Sep. 5, 2001

(65) Prior Publication Data

US 2003/0055774 A1  Mar. 20, 2003

(51) Int. Cl.
*G06Q 40/00* (2012.01)

(52) U.S. Cl.
USPC .......................................................... 705/37

(58) Field of Classification Search ...................... 705/37
See application file for complete search history.

(56) References Cited

U.S. PATENT DOCUMENTS

| | | | |
|---|---|---|---|
| 5,819,237 A | 10/1998 | Garman | 705/36 |
| 6,195,647 B1 | 2/2001 | Martyn et al. | 705/37 |
| 6,272,474 B1 | 8/2001 | Garcia | 705/37 |
| 6,321,212 B1 | 11/2001 | Lange | 705/37 |
| 6,332,129 B1 | 12/2001 | Walker et al. | 705/26 |

FOREIGN PATENT DOCUMENTS

GB  2 352 844 A  2/2001

OTHER PUBLICATIONS

Caffrey, "States try to deter power price gouging", Apr. 30, 2001, available @ http://proquest.umi.com/pqdweb?index=5&sid=2&srchmode=1&vinst=PROD&fmt=3&startpage=-1&clientid=19649&vname=PQD&RQT=309&did=71956376&scaling=FULL&ts=1186349799&vtype=PQD&rqt=309&TS=1186349828&clientId=19649&cc=1&TS=1186349828, last accessed Aug. 5, 2007.*
Energy and Electric Utilities State Laws and Regulations: Price Gouging, available @ http://www.ncsl.org/programs/energy/lawsgouging.htm, last accessed Sep. 6, 2007.*
The Clayton Antitrust Act (1914), available @ http://www.stolaf.edu/people/becker/antitrust/statutes/clayton.html, last accessed Aug. 6, 2007.*
International Search Report for International Application No. PCT/US02/26575, dated Dec. 13, 2002 (3 pages).
International Preliminary Examination Report for International Application No. PCT/US02/26575, dated Mar. 7, 2004 (5 pages).

* cited by examiner

*Primary Examiner* — James Trammell
*Assistant Examiner* — Daniel L Greene
(74) *Attorney, Agent, or Firm* — Mark A. Miller

(57) ABSTRACT

Systems and methods for trading commodity, an item or instrument are provided. The market prices and trading may be monitored to detect a spike in the market price or artificially high market price. Excess profits resulting from the sale at an artificially high market price may be distributed to market participants based upon the participant's trading record in the market or upon some other suitable method.

22 Claims, 4 Drawing Sheets

SYSTEMS AND METHODS FOR SHARING EXCESS PROFITS

BACKGROUND OF THE INVENTION

The present invention relates to systems and methods for trading. More particularly, the present invention relates to systems and methods for electronic trading where excess profits may be shared amongst members of a trading market.

In recent years, electronic trading systems have gained a widespread acceptance for trading items. For example, electronic trading systems have been created which facilitate the trading of financial instruments such as stocks, bonds, currency, futures, or other suitable financial instruments.

Many of these electronic trading systems use a bid/offer process in which bids and offers are submitted to the systems by a passive side and then those bids and offers are hit and lifted (or taken) by an aggressive side. For example, a passive trader may submit a "bid" to buy a particular number of 30 year U.S. Treasury Bonds at a given price. In response to such a bid, an aggressive trader may submit a "hit" in order to indicate a willingness to sell bonds to the first trader at the given price. Alternatively, a passive side trader may submit an "offer" to sell a particular number of the bonds at the given price, and then the aggressive side trader may submit a "lift" (or "take") in response to the offer to indicate a willingness to buy bonds from the passive side trader at the given price. In such trading systems, the bid, the offer, the hit, and the lift (or take) may be collectively known as "orders." Thus, when a trader submits a bid, the trader is said to be submitting an order.

Given the laws of supply and demand, if a first trader desires to buy or sell a particular financial instrument or other item, other traders may modify their prices for that instrument or item to the detriment of the first trader in order to take advantage of that desire—e.g., raise the price so the first trader is required to raise his bid for the item or instrument. In this way, the other traders may distort the market price of the instrument or item away from what the price would be for that instrument or item trading with the same size over varied buyers and sellers. Accordingly, spikes in the market price or temporally high market prices may result for that instrument or item.

Accordingly, it would be desirable to provide systems and methods for electronic trading where excess profits obtained from a sale temporally high prices are redistributed to market participants.

SUMMARY OF THE INVENTION

It is an object of this invention to provide systems and methods for trading of an item or instrument where excess profits obtained from a sale of an item or instrument at artificially high prices are redistributed to market participants.

In accordance with the present invention, systems and methods for trading are provided. A spike temporally (or artificially) high prices in the marketplace may be detected, and excess profits derived from the sale at temporally (or artificially) high prices may be shared amongst the participants in the market based upon their trading record in the marketplace.

A method according to the invention for determining excess profits preferably includes monitoring a trading price for a traded instrument or item, determining a benchmark trading price based on the monitoring, comparing the benchmark trading price to a selected trading price to determine a difference between the benchmark trading price and the selected trading price, determining whether the difference exceeds a defined difference level, and, when the difference exceeds the defined difference level, determining an amount of excess profits based on the difference.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which.

DETAILED DESCRIPTION OF THE INVENTION

One example of trading methods and systems according to the invention is as follows. A trading price of electricity changes during a normal trading day. Nevertheless, some individual trades occur at levels that are unrelated to the established trading price as will be described. The methods and systems according to the invention reduce the economic dislocation caused by these individual, outlying trades.

For example, in a typical case, a megawatt/hour for on-peak demand in the day ahead market trades within ten percent of $60.00 for five minutes. Then, a trade occurs at $120.00 per megawatt/hour. Thereafter, the megawatt/hour returns to trading within ten percent of $60.00 for the next five minutes. The five minutes before the outlying trade and the five minutes after the outlying trade have established a benchmark value, or range of values, for the kilowatt/hour. The outlying trade occurred outside the value, or range of values, established for the benchmark value. Thus, the outlying trade generated excess profits for the seller. Methods and systems according to the invention record such excess profits and redistribute them at a suitable time period—e.g., every day, every hour etc.—either according to market share, or share of excess loss, or some other suitable determinant as determined by the market administrator or by some other suitable person or method.

The previous example was intended for purposes of illustration only. It should be understood, however, that the systems and methods according to the invention apply to any traded commodity—e.g., energy, oil, natural gas, etc.—item or instrument. Furthermore, the benchmark value may be obtained over any suitable time period—e.g. one minute, on hour, one day, one week, one month etc. It is most preferred that this system be implemented in an electronic trading platform. Nevertheless, the systems and methods of the invention do not necessarily require an electronic trading platform.

It should be noted that the benchmark value, or range of values, may preferably be computed according to any suitable statistical method—e.g., average, weighted average, median, mode or any suitable metric method. These methods and systems preferably reduce dislocation created by outlying trades and other phenomena that result in trading price spikes.

In another example according to the invention, the trading price of electricity for an entire day may spike because of high temperatures occurring during the day. in such a circumstance, the benchmark value, or range of values, may be formed based on the price for electricity over the five days before the selected trading day and the price of electricity five days after the selected trading day.

The present invention is now described in more detail in conjunction with FIGS. 1-4.

Figure 1:
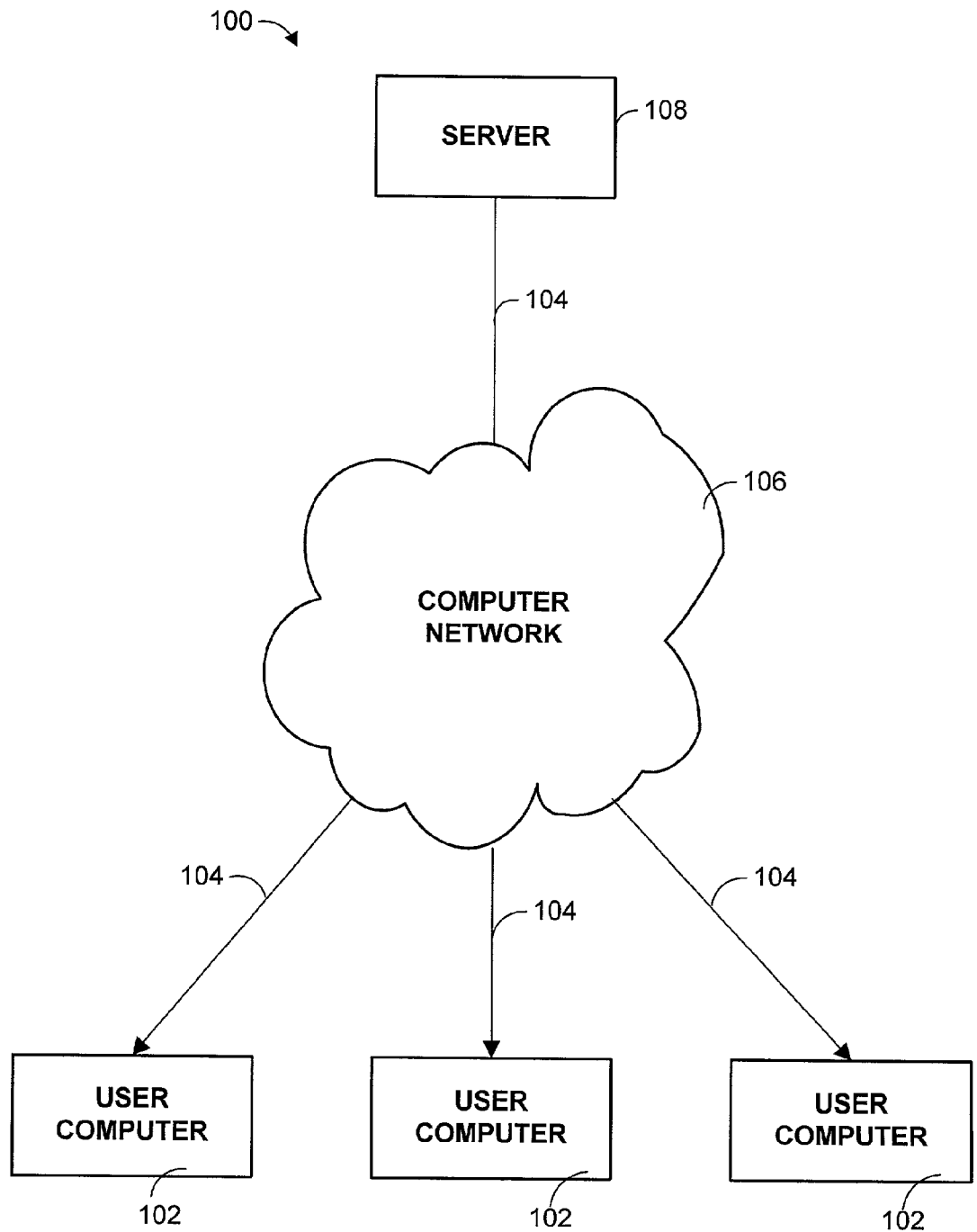
FIG. 1 is an illustration of a hardware implementation of an electronic trading system in accordance with certain embodiments of the present invention.

FIG. 1 is an illustration of a hardware implementation of an electronic trading system in accordance with certain aspects of the present invention. As shown, system 100 may include one or more user computers 102 that may be connected by one or more communication links 104 and a computer network 106 to a trading server 108.

In system 100, user computer 102 may be a computer, processor, personal computer, laptop computer, handheld computer, personal digital assistant, computer terminal, a combination of such devices, or any other suitable data processing device. User computer 102 may have any suitable device capable of receiving user input.

Communications links 104 may be optical links, wired links, wireless links, coaxial cable links, telephone line links, satellite links, lightwave links, microwave links, electromagnetic radiation links, or any other suitable communications links for communicating data between user computers 102 and trading server 108.

Computer network 106 may be the Internet, an intranet, a local area network (LAN), a wide area network (WAN), a metropolitan area network (MAN), a virtual private network (VPN), a wireless network, an optical network, an asynchronous transfer mode network (ATM), a cable network, a frame relay network, a digital subscriber line network (DSL), or any other suitable network.

Trading server 108 may be a processor, a computer, a data processing device, or any other suitable server capable of processing electricity trades.

All trading interactions between user computers 102 preferably occur via computer network 106, trading server 108, and communications links 104. Traders or users at user computers 102 may conduct trading transactions using suitable input devices connected to or part of user computers 102.

Figure 2:
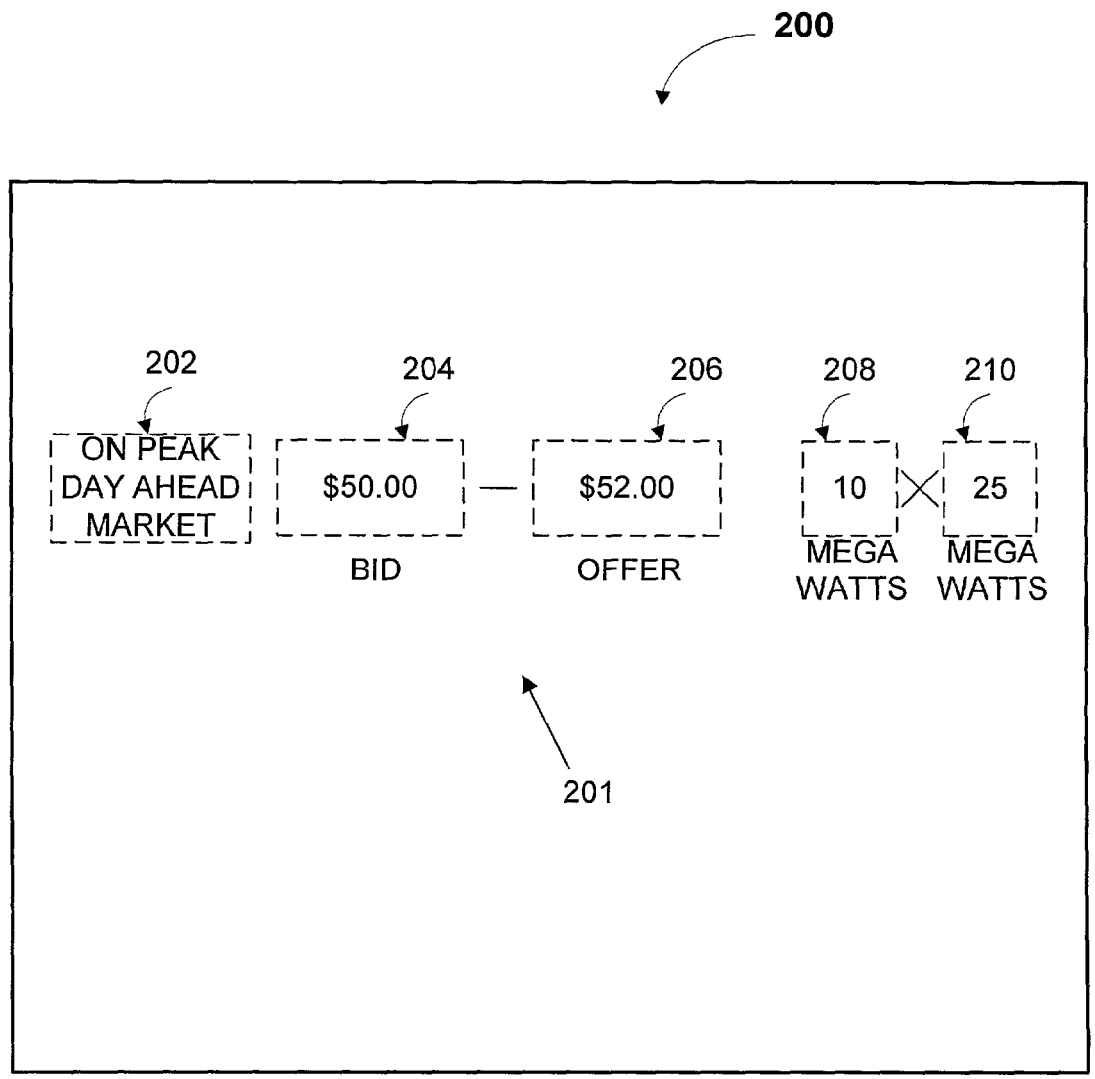
FIG. 2 is an illustration of a screen display that may be presented in accordance with certain embodiments of the present invention.

FIG. 2 is an illustration of a screen display that may be presented in accordance with certain aspects of the present invention. As shown, display 200 may include bid/offer 201, instrument 202, bid price 204, offer price 206, bid size 208, and offer size 210.

Instrument 202, bid price 204, offer price 206, bid size 208, and offer size 210 may be highlighted with one or more colors, or in any other suitable manner, to indicate various traits of the bid/offer.

Instrument 202 may be an electricity instrument from a particular supplier. Bid price 204 may be the current bid price for electricity from a trader. Offer price 206 may be an offer price for the electricity. Bid size 208 may be the amount of electricity being offered at the offer price 206.

Figure 3:
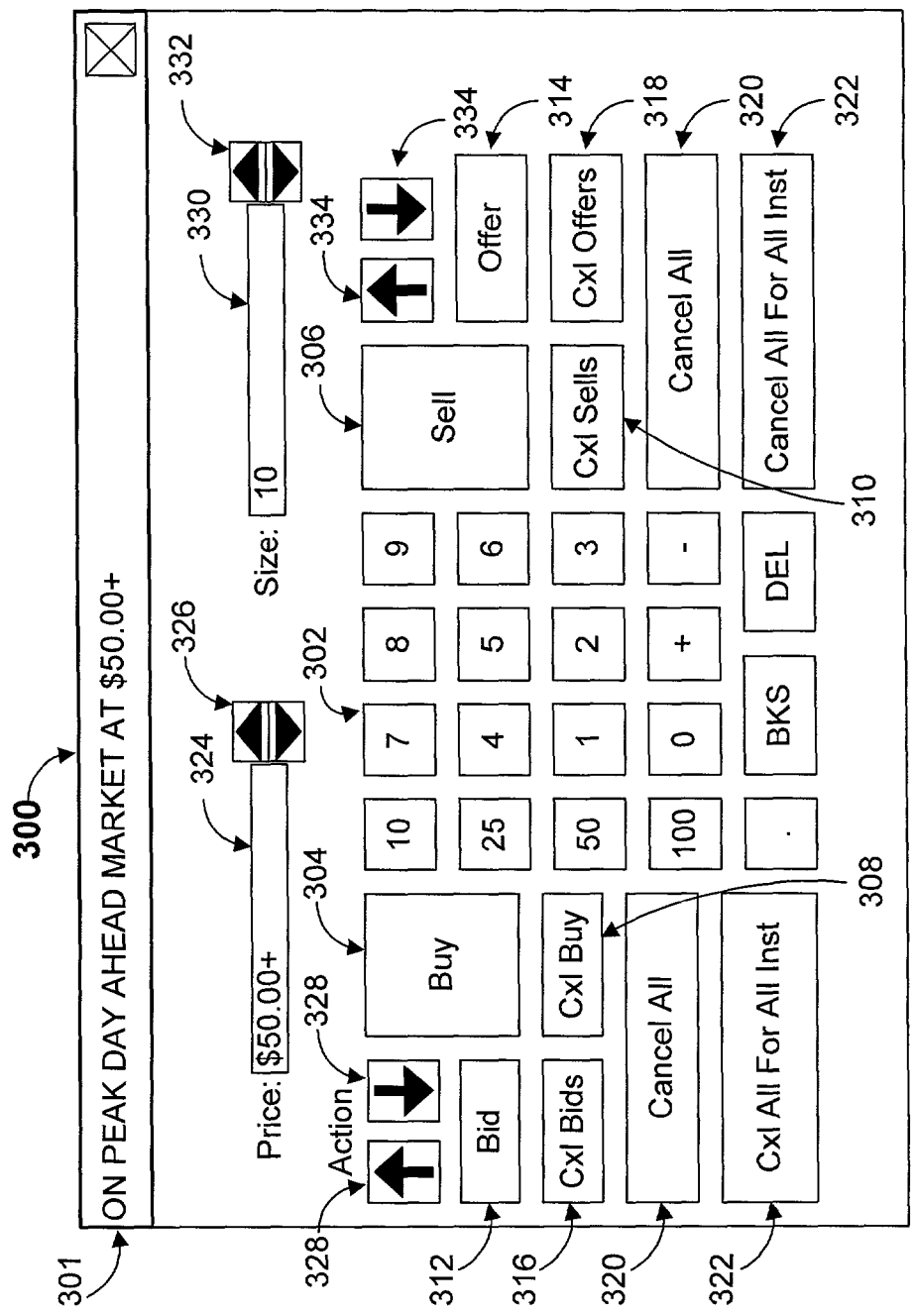
FIG. 3 is an illustration of an interface that may be presented in accordance with certain embodiments of the present invention.

FIG. 3 is an illustration of an interface that may be presented in accordance with certain aspects of the present invention. As shown, interface 300 may include numeric keypad 302, buy button 304, sell button 306, cancel buy button 308, cancel sell button 310, bid button 312, offer button 314, cancel bid button 316, cancel offers button 318, cancel all button 320, cancel all instruments button 322, price entry field 324, price up/down buttons 326, bid price up/down buttons 328, size entry field 330, size up/down buttons 332, and offer price up/down buttons 334.

Numeric keypad 302 may provide numbers 0-9, 10, 25, 50, and 100. Numeric keypad may contain a plus button ("+"), a minus button ("−"), a decimal point ("."), a backspace button ("BKS"), a delete button ("DEL"), or any other suitable button.

Interface 300 may be presented on a display of user computer 102 of FIG. 1 in response to the selection of instrument 202, bid price 204, offer price 206, bid size 208, and offer size 210 of FIG. 2.

When presented, interface 300 may indicate information about the bid and offer selected by the trader in display 301.

In order to submit a bid or offer for the instrument indicated in display 301 using interface 300, a trader may first set a bid or offer price and a bid or offer size by entering the appropriate values in fields 324 and 330, respectively, using up/down buttons 326, 328, 332, and/or 334 and/or using keypad 302. Once the desired price and size for the bid or offer have been specified, the trader may then submit the bid or offer by pressing bid button 304 or the offer button 314.

In order to hit a bid or lift (or take) for an offer for the instrument indicated in display 301 using interface 300, a trader may first specify a size in field 330 using up/down buttons 332 and/or 334 and/or using keypad 302. Once the desired size has been specified, the trader may then hit the bid or lift (or take) the offer for the specified size by pressing sell button 306 or buy button 304, respectively.

In the event that a trader desires to cancel a bid, an offer, a hit, or a lift (or take), the trader may press any corresponding one of buttons 308, 310, 316, 318, 320 and 322.

Figure 4:
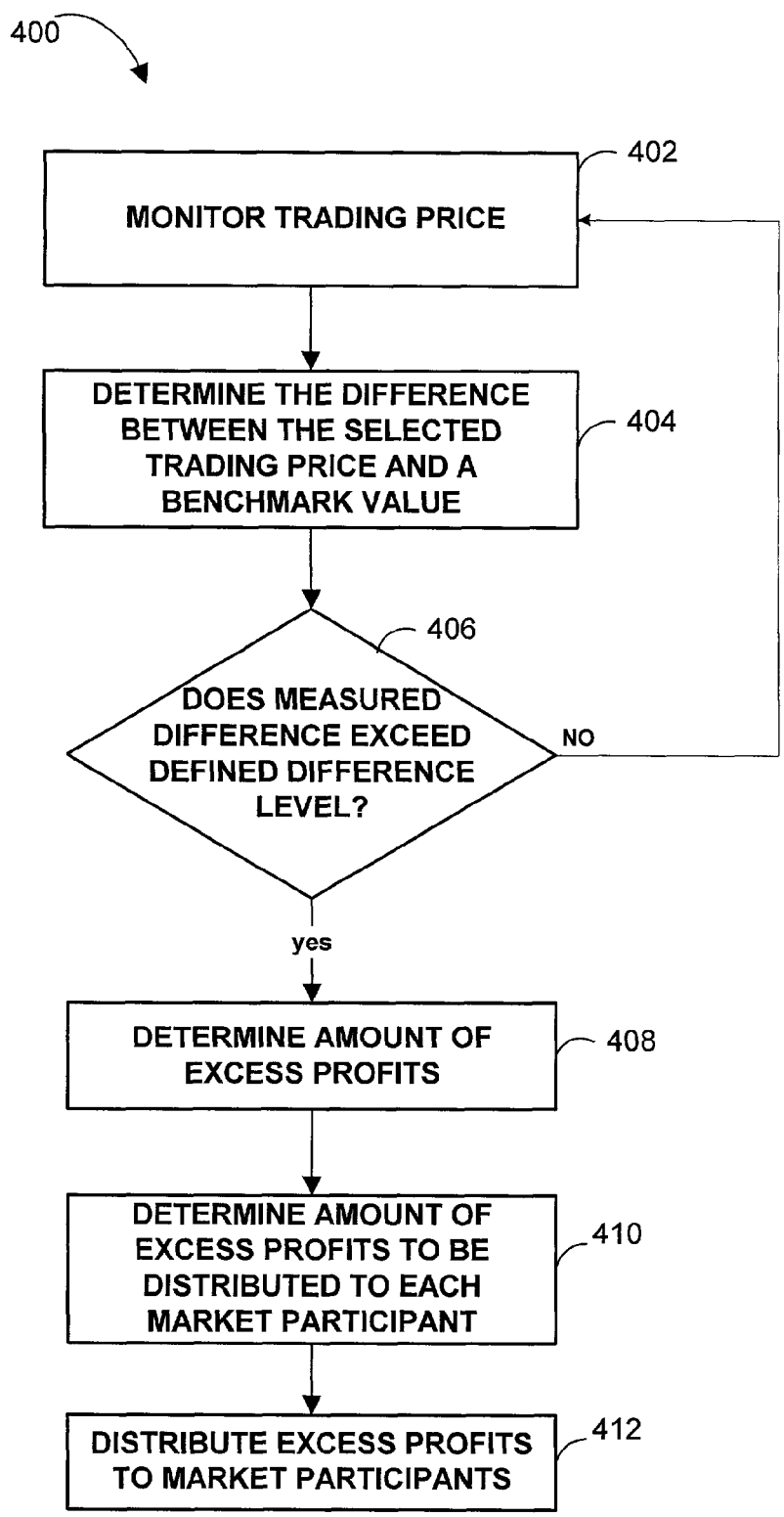
FIG. 4 is an illustration of a flow diagram for determining and distributing excess profits to market participants in accordance with certain embodiments of the present invention.

FIG. 4 is an illustration of a flow diagram for determining and distributing excess profits to market participants in accordance with certain aspects of the present invention. As shown, shared excess profits method 400 may include monitoring trading price step 402, determining price difference step 404, exceed defined level test 406, determine excess profits step 408, determine profits to be distributed step 410, and distribute profits step 412.

Monitoring trading price step 402 may continually gather bid/offer and selling price information for electricity.

Step 404 may determine the difference between two selected trading prices. A trading systems administrator may view the electricity trading price data acquired in step 402 in a graphical or other suitable format. The administrator may identify and select two points of price data. The difference between the two selected price data items may be calculated. For example, the first point of data may be calculated according to a running average which is tabulated at a pre-determined time period. The second point of data may represent a single, and preferably the last executed, trade.

Test 406 may determine whether the measured difference between two selected price points exceeds a defined difference level. The difference level may be predefined by a trading systems administrator or other suitable electricity market supervisor or regulatory official. If the measured difference level does not exceed the defined difference level, the trading price for electricity may continue to be monitored at step 402.

If the measured difference level does meet or exceed the defined difference level, step 408 may determine the amount of excess profits. The overall amount of excess profits may factor in the difference between the two selected price data points and the quantity of electricity units sold at difference price points between the selected data points. The amount of excess profits may also be calculated by determining the difference between an average price over a pre-determined period—e.g., the last five minutes of trading, the last 10 minutes of trading, etc.—and a selected data price point for electricity, or in any other suitable fashion, as described above.

Step 410 may determine the amount of excess profits to be distributed to each market participant. The amount of excess profits that may be allocated for a market participant may be determined by the quantity of electricity purchased or sold, as well as the purchase price associated with the quantity or quantities purchased or sold between the two selected trading price points. Market participants that may have paid artificially high prices for large quantities of electricity may receive a greater share of excess profits than other market participants. Similarly, market participants who sold large quantities of electricity at artificially high market prices may be required to redistribute excess profits associated with those trades which are above the profits that may have been attained by selling the same quantity of electricity at benchmark market price or range of prices. Once the amount of excess profits for each market participant have been determined, they may be distributed at step 412.

In another embodiment of the invention, a system or method according to the invention may be implemented in an auction format. At the end of a typical auction, the winner takes the item being auctioned and pays the money that he bid. Often, the winner's bid is higher than he intended at the outset of the auction or, in the alternative, higher than the actual value of the item or instrument being auctioned. In order to prevent this phenomenon, commonly known in the art as the "winner's curse", one may preferably redistribute all or a portion of the excess profits generated by the winning bid. Excess profits may be determined as some proportion of the reserve price e.g., anything over 200% of the reserve price is considered excess—or by some other suitable fashion. The excess profits may be distributed to the winner or in some other suitable format such that all or a portion of the excess profits are reduced.

Accordingly, systems and methods for trading are provided. It will be understood that the foregoing is merely illustrative of the principles of the invention and the various modifications can be made by those skilled in the art without departing from the scope and spirit of the invention, which is limited only by the claims that follow.

What is claimed is:

1. A method comprising:
by computer, identifying a trade of a traded instrument or item occurring at an outlier price deviating from a benchmark price, the benchmark price reflecting at least one of a price and a range of prices at which the instrument or item would have traded in absence of market distortion, the trade involving at least one first distributee participant of a plurality of distributee participants in a market for the traded instrument or item, wherein the benchmark price includes a range of benchmark trading prices; and
distributing at least a portion of profits earned because of the deviation of the price of the outlier-price trade from the benchmark price, to at least one second distributee participant of the plurality of distributee participants in the market for the traded instrument or item.

2. A method comprising:
by computer of an electronic trading platform, identifying a trade of a traded instrument or item occurring at an outlier price deviating from a benchmark price, the benchmark price reflecting at least one of a price and a range of prices at which the instrument or item would have traded in absence of market distortion, the trade involving at least one first distributee participant of a plurality of distributee participants in a market for the traded instrument or item; and
distributing at least a portion of profits earned because of the deviation of the price of the outlier-price trade from the benchmark price, to at least one second distributee participant of the plurality of distributee participants in the market for the traded instrument or item.

3. The method of claim 2, wherein the instrument or item includes one or more of electricity, natural gas, energy, and oil.

4. The method of claim 2, further comprising distributing the at least the portion of the profits attributable to the deviation to the at least one second distributee participant of the plurality of distributee participants based at least in part on a proportion of market share attributable to the at least one second distributee market participant.

5. The method of claim 2, further comprising distributing the at least the portion of the profits attributable to the deviation to the at least one second distributee participant of the plurality of distributee participants in proportion to a share of profits attributable to the deviation obtained from the at least one second distributee market participant.

6. The method of claim 2, further comprising determining the benchmark price at least in part by monitoring trading prices over a time interval.

7. The method of claim 6, wherein the monitoring comprises sampling the trading prices at pre-determined intervals.

8. The method of claim 6, wherein the trading prices include prices for trades occurring after the outlier-price trade.

9. The method of claim 2, further comprising determining the benchmark price at least in part by determining a running average of the trading prices.

10. The method of claim 2, further comprising determining the benchmark price at least in part by determining a median trading price.

11. The method of claim 2, further comprising determining the benchmark price at least in part by determining a mode trading price.

12. The method of claim 2, wherein the benchmark price includes a last-in-time trading price.

13. The method of claim 2, further comprising determining the benchmark price at least in part by determining a weighted average trading price.

14. A method comprising:
determining a benchmark price at least in part by monitoring trading prices over a time interval, wherein the monitoring includes monitoring for prices remaining stable within a relatively small percentage range;
by computer, identifying a trade of a traded instrument or item occurring at an outlier price deviating from the benchmark price, the benchmark price reflecting at least one of a price and a range of prices at which the instrument or item would have traded in absence of market distortion, the trade involving at least one first distributee participant of a plurality of distributee participants in a market for the traded instrument or item; and
distributing at least a portion of profits earned because of the deviation of the price of the outlier-price trade from the benchmark price, to at least one second distributee participant of the plurality of distributee participants in the market for the traded instrument or item,
further comprising determining the benchmark price at least in part by monitoring trading prices over a time interval.

15. The method of claim 14, wherein the trading prices include prices for trades occurring after the outlier-price trade.

16. A non-transitory medium having stored thereon a plurality of instructions that when executed by a computer, instruct the computer to:

identify a trade of a traded instrument or item that occurred at an outlier price deviating from a benchmark price, the benchmark price reflecting at least one of a price and a range of prices at which the instrument or item would have traded in absence of market distortion, the trade involving at least one first distributee participant of a plurality of distributee participants in a market for the traded instrument or item, wherein the benchmark price includes a range of benchmark trading prices; and generate a request that at least a portion of profits earned because of the deviation of the price of the outlier-price trade from the benchmark price, be distributed to at least one second distributee participant of the plurality of distributee participants in the market for the traded instrument or item.

17. The non-transitory medium of claim 16, wherein the instructions instruct the computer to determine the benchmark price at least in part by determining a weighted average trading price.

18. The non-transitory medium of claim 16, wherein the instrument or item includes one or more of electricity, natural gas, energy, and oil.

19. The non-transitory medium of claim 16, wherein the instructions instruct the computer to monitor prices at which trades of the instrument or item occur over a time interval.

20. The non-transitory medium of claim 19, wherein the prices monitored include prices for trades occurring after the outlier-price trade.

21. The program of claim 16, wherein the program is further configured to instruct the computer to:

distribute the at least the portion of the profits attributable to the deviation to the at least one second distributee participant of the plurality of distributee participants in proportion to a share of profits attributable to the deviation obtained from the distributee market participants.

22. A method comprising:

determining a benchmark price at least in part by monitoring trading prices over a time interval, wherein the monitoring further comprising monitoring a plurality of trading prices, wherein the instrument or item including at least electricity, wherein the monitoring of prices comprise sampling the plurality of trading price at pre-determined intervals, and wherein the method further comprising maintaining a running period of the sampled trading prices falling within a range to determine a mode among the samples of a running period the mode corresponding to the benchmark price;

by computer, identifying a trade of a traded instrument or item occurring at an outlier price deviating from the benchmark price, the benchmark price reflecting at least one of a price and a range of prices at which the instrument or item would have traded in absence of market distortion, the trade involving at least one first distributee participant of a plurality of distributee participants in a market for the traded instrument or item; and distributing at least a portion of profits earned because of the deviation of the price of the outlier-price trade from the benchmark price, to at least one second distributee participant of the plurality of distributee participants in the market for the traded instrument or item, further comprising determining the benchmark price at least in part by monitoring trading prices over a time interval.

* * * * *